United States Patent
Harris

(10) Patent No.: US 8,312,286 B2
(45) Date of Patent: Nov. 13, 2012

(54) WIRELESS NETWORK HAVING MULTIPLE COMMUNICATION ALLOWANCES

(75) Inventor: Scott C. Harris, Rancho Sante Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

(21) Appl. No.: 12/345,565

(22) Filed: Dec. 29, 2008

(65) Prior Publication Data

US 2009/0113208 A1 Apr. 30, 2009

Related U.S. Application Data

(63) Continuation of application No. 10/800,472, filed on Mar. 15, 2004, now Pat. No. 7,490,348.

(60) Provisional application No. 60/454,694, filed on Mar. 17, 2003.

(51) Int. Cl.
*H04L 29/06* (2006.01)

(52) U.S. Cl. ........ 713/183; 713/153; 713/155; 713/156; 726/2; 726/4; 726/14; 726/21; 726/27; 725/29; 725/30

(58) Field of Classification Search .............. 713/153, 713/155, 156, 183; 726/2, 4, 14, 21, 27; 725/29, 30
See application file for complete search history.

(56) References Cited

U.S. PATENT DOCUMENTS

| | | | |
|---|---|---|---|
| 6,571,221 B1 | 5/2003 | Stewart et al. | |
| 6,856,676 B1 * | 2/2005 | Pirot et al. | 379/201.01 |
| 7,046,684 B2 * | 5/2006 | Matsuura | 370/401 |
| 7,103,313 B2 | 9/2006 | Heinonen et al. | |
| 7,155,437 B2 | 12/2006 | Chang et al. | |
| 7,173,922 B2 | 2/2007 | Beach | |
| 7,173,923 B2 | 2/2007 | Beach | |
| 7,215,638 B1 * | 5/2007 | Roberts et al. | 370/231 |
| 7,286,848 B2 * | 10/2007 | Vireday et al. | 455/550.1 |
| 7,315,823 B2 | 1/2008 | Brondrup | |
| 7,428,413 B2 | 9/2008 | Fink | |
| 7,472,191 B2 | 12/2008 | Stewart et al. | |
| 7,486,628 B1 | 2/2009 | Brisebois et al. | |
| 7,493,084 B2 | 2/2009 | Meier et al. | |
| 7,523,046 B2 | 4/2009 | Colalancia et al. | |
| 7,633,909 B1 | 12/2009 | Jones et al. | |
| 7,856,659 B2 | 12/2010 | Keeler et al. | |
| 8,099,321 B2 | 1/2012 | Keeler et al. | |
| 2002/0152402 A1 * | 10/2002 | Tov et al. | 713/201 |
| 2003/0182377 A1 * | 9/2003 | Tabet et al. | 709/205 |

OTHER PUBLICATIONS

WiFi: An Emerging Information Society Infrastructure, Auray, Beauvallet, Charbit, Fernandez, STAR Issue Report N. 40, Sep. 2003.

* cited by examiner

*Primary Examiner* — Carl Colin
*Assistant Examiner* — Gary Lavelle

(57) ABSTRACT

Multiple levels of wireless network resource granting. A user who has an authorized key, e.g., an encryption key or a key indicating that they have paid for service, gets a first, better level of access to the network resources. One without the key is granted lesser access, e.g., less total bandwidth, less bandwidth speed, no access to files or the like.

18 Claims, 1 Drawing Sheet

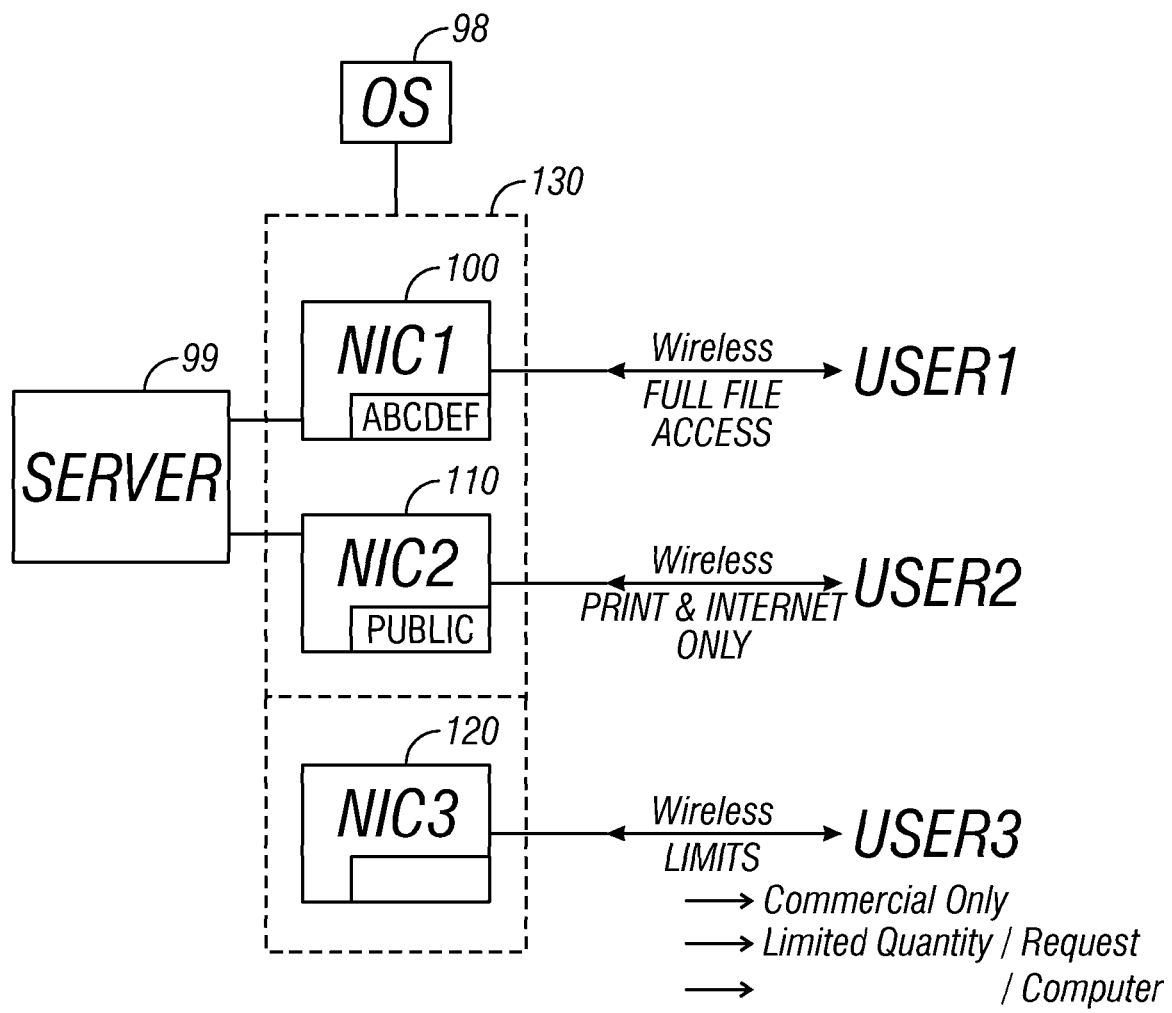

WIRELESS NETWORK HAVING MULTIPLE COMMUNICATION ALLOWANCES

This application claims priority to U.S. Provisional Ser. No. 60/454,694 filed Mar. 14, 2003.

FIELD OF INVENTION

Wireless networks are well-known, and may be based, for example, on the 802.11 standard. Because the contents of the wireless network can be received by anyone with wireless access, security may be achieved through encryption of the stream. Anyone with an encryption code can tap into the network. Those without the encryption code, however, simply cannot decode the wireless stream. In addition, standard network protocols may be used, so that not only the encryption code, but also a network login, is necessary.

SUMMARY

The present application describes a wireless network, defining a plurality of different classes of service, where the different classes of service include at least a first class of service that includes a first set of permissions for access to resources, and a second class of service which includes a second set of permissions of access to resources.

BRIEF DESCRIPTION OF THE DRAWINGS

These and other aspects will now be described in detail with reference to the accompanying drawings, in which:

FIG. 1 shows a basic diagram of the networks described herein.

DETAILED DESCRIPTION

Wireless networks have been used for other things besides secure file transfer. For example, Internet Cafes, and "wireless hot spots" may include the capability of communication to a user's personal laptop which is equipped with a wireless card. This may use a network key for the encryption of the word "public", or a network key which is given to users who pay for the service or pay for a drink or food, or without any network key at all. Certain areas such as hotel rooms are often wireless enabled. However, the communication is typically or totally on, or totally off; that is either the user is allowed to receive wireless Internet, or the user is blocked from all communications.

The present system teaches a network with multiple levels of capability, depending on the access credentials possessed by the user. FIG. 1 shows this being carried out using multiple network cards or NICs. However, the same effect can be obtained with a single NIC. Preferably the network cards are wireless, using one of the features of IEEE 802.11 wireless communication protocols.

Different classes of users may be assigned. The first class of users, shown as user 1, are allowed file access to files and information from the server. These users may be given the encryption key, here for the first NIC 100 here shown as ABCDEF. These users may be allowed the highest level of access to resources. As conventional users who have the complete set of credentials, they are allowed unlimited upload and download, and full file access (that is allowed to non-administrator users). In addition, these users may be allowed the maximum upload and download speeds which is given to network users, and to receive all different kinds of Internet and files from all sources.

For example, the amount of access which is provided to these users may be assigned by the operating system which drives the NICS. For example, if Windows XP is used as the operating system, it may assign NIC 100 with unlimited file access.

A second class of users shown as user 2 do not have the credentials, here the encryption key, for the network card 100, and hence use the encryption key "public" and thereby can only communicate with the network card No. 2 shown as 110. Alternatively, these same users may communicate using no encryption key at all. The network card 110 allows only some subset of the operations that are allowed by the network card 100. For example, the user 2 may receive Internet only, and no file access. They may be allowed to print. In addition, the upload and download speeds may be limited or severely limited; for example, the Internet may be limited to 1M download speeds and 100K of upload speed.

This system as described above may be usable in an office environment. For example, users who are actually members of the office obtain file access, while visitors only receive print and Internet access.

Another contemplated use is in pay-for-Internet use. The user 1 may pay a higher fee than the user 2. For example, user 2 may pay only for limited Internet, while user 1 may pay for access to resources such as video over IP, and higher download speeds from the Internet.

In addition, a third class of users shown as user 3 may be defined. These users communicate only to NIC 120. Note that while this describes users 1, 2 and 3, any subset of these users may be used, for example a system may be configured which only communicates with user 1 and user 3. The NIC No. 3 is shown as having no encryption code whatsoever. User 3 is limited even further. User 3 may receive only commercial parts of the Internet. In the office environment, this may limit the Internet to web pages describing the office and/or certain intranet sites. In a pay for internet environment, this may describe the "free" user, who may only receive certain content. User 3 may also receive a severely restricted bandwidth and/or only a limited quantity of information. For example, the user 3 may be assigned a token which allows them only to receive for example total of 1 megabytes of download and only to upload 100 Kilobytes of upload. This even further limits the user 3.

As described above, the different users in their different classes have different levels of file access, and resource access, resource speed and resource amount.

FIG. 1 shows this being carried out with three different network cards over the same airspace. Alternatively, the three different networks may be carried out as part of a single network card; shown as network card 130. For example, this may include three network resources which operate on the single card. Alternatively, the three different kinds of resources may be carried out in software, for example this may be carried out by three different network resource allowances within the software that runs the network card or within the server 99.

Other implementations are within the disclosed embodiment

The invention claimed is:
1. A network transmitting system, comprising:
a first networking device, transmitting an unencrypted first wireless network stream from a first location, said first wireless network stream requiring a first key in order to access content in said first wireless network stream, and said first wireless network stream, when accessed using said first key, providing a first level of access to network resources;
wherein said first level of access to network resources provided by said first wireless network stream does not include access to information on a server, and allows access to one or more specific webpages without said first key but does not allow access to a second subset of webpages without said first key, and allows access to additional webpages including said second subset of webpages with said first key;

a second networking device, transmitting an unencrypted second wireless network stream from an area overlapping in the same space as the first networking device, said second wireless network stream controlling access with a second key, and providing a second level of access to network resources in order to access said second wireless network stream, wherein said second level of access to network resources provided by said second wireless network stream does not include access to the information on the server, and allows access to the internet including said second subset of webpages with said second key.

2. A system as in claim 1, wherein said first networking device and said second networking device are two separate devices which are physically in a same housing.

3. A network transmitting system as in claim 1, wherein said first level of access provided by said first wireless network stream provides access to video over IP over said first wireless network stream, and said second level of access provided by said second wireless network stream does not provide access to video over IP over said second wireless network stream.

4. A network transmitting system as in claim 1, wherein said first level of access to network resources provides a first speed of network access, and said second level of access to network resources provides a second speed of network access, wherein said second speed is lower than said first speed.

5. A system as in claim 4, wherein said second level of access has less bandwidth than said first level of access.

6. A system as in claim 1, wherein said first level of access provides access to a first service over IP and said second level of access blocks access to said first service over IP.

7. A system as in claim 6, wherein said second key is different than the first key.

8. A system as in claim 1, wherein said first is provided on payment for a service.

9. A system as in claim 1, wherein said second level of access limits access such that only specific Internet pages can be obtained.

10. A system as in claim 1, wherein said first and second levels of access to network resources provide different levels of all of file access, resource access, resource speed, and resource amount.

11. A system as in claim 1, further comprising a third networking device, transmitting, from an area overlapping in the same space as the first networking device, wherein said third networking device operates without either of said first key or said second key and provides a third level of access to resources which includes access to information on the server.

12. A network transmitting system, comprising:

a first networking device, transmitting a first wireless network stream from a first location, said first wireless network stream sending and receiving encrypted information in order to access said first wireless network stream, and said first wireless network stream providing a first level of access to network resources using said encrypted information;

wherein said first level of access to network resources includes access to information on a server, a second networking device, transmitting a second wireless network stream from an area overlapping in the same space as the first networking device, said second wireless network stream, said second networking device controlling access with a key, wherein said second level of access to network resources provided by said first wireless network stream does not include access to said information on said server, and allows access to one or more specific webpages without said key but does not allow access to a second subset of webpages without said key, and allows access to additional webpages including said second subset of webpages with said key, wherein said second level of access to network resources provided by said second wireless network stream does not include access to the information on the server; and a third networking device, transmitting a third wireless network stream overlapping in the same space as the first networking device, wherein said third networking device operates without said key and provides internet access without said key.

13. A system as in claim 12, wherein said first networking device and said second networking device are two separate devices which are physically in a same housing.

14. A system as in claim 12, wherein said first level of access provided by said first wireless network stream provides access to video over IP over said first wireless network stream via said encrypted information as a first service, and said third wireless network stream does not provide access to said first service of video over IP.

15. A network transmitting system, comprising:

a first networking device, transmitting a first unencrypted wireless network stream, said first wireless network stream requiring a first key in order to access said first wireless network stream, and said first wireless network stream, when accessed using said first key, providing a first level of access to network resources, and providing access to video over IP which can be accessed using said first key;

wherein said first level of access to network resources provided by said first wireless network stream does not include access to information on a server with said first key, and allows access to one or more specific webpages without said first key but does not allow access to a second subset of webpages without said first key, and allows access to additional webpages including said second subset of webpages with said first key;

a second networking device, transmitting a second wireless network stream that is a separate network from said first wireless network stream, said second wireless system network stream controlling access without said first key, and providing a second level of access to network resources with a second key in order to access said second wireless network stream, where said second level of access to network resources does not allow access to information on said server, and also said second level of access to network resources does not allow access to video over IP, and allows access to the internet including said second subset of webpages with said second key.

16. A system as in claim 15, wherein said first networking device and said second networking device are two separate devices which transmit over a same area.

17. A system as in claim 15, wherein said second wireless network stream allows access of limited bandwidth.

18. A system as in claim 15, further comprising a third networking device, transmitting a third wireless network stream, wherein said third networking device operates without either of said first key or said second key and provides a third level of access to resources which provides access to information on said server.

* * * * *

UNITED STATES PATENT AND TRADEMARK OFFICE
CERTIFICATE OF CORRECTION

PATENT NO. : 8,312,286 B2
APPLICATION NO. : 12/345565
DATED : November 13, 2012
INVENTOR(S) : Scott C Harris It is certified that error appears in the above-identified patent and that said Letters Patent is hereby corrected as shown below:

Claim 8, column 3 of the patent, line 36, after "first", insert --key--.

Claim 12, column 3 of the patent, line 62, after "said second wireless network stream", insert --not being encrypted, and providing a second level of access to network resources in order to access said second wireless network stream--.

Claim 12, column 3 of the patent, last line, change "first" to "second".

Signed and Sealed this
Twenty-fifth Day of December, 2012

David J. Kappos
*Director of the United States Patent and Trademark Office*